United States Patent
Huang et al.

(10) Patent No.: US 12,430,817 B2
(45) Date of Patent: Sep. 30, 2025

(54) THREE-DIMENSIONAL SPECTRUM SITUATION COMPLETION METHOD AND DEVICE BASED ON GENERATIVE ADVERSARIAL NETWORK

(71) Applicant: Nanjing University of Aeronautics and Astronautics, Nanjing (CN)

(72) Inventors: Yang Huang, Nanjing (CN); Qiuming Zhu, Nanjing (CN); Tianyu Hu, Nanjing (CN); Qihui Wu, Nanjing (CN); Zhiren Gong, Nanjing (CN); Xuan Wu, Nanjing (CN); Weizhi Zhong, Nanjing (CN); Kai Mao, Nanjing (CN); Xiaofei Zhang, Nanjing (CN); Yiwei Lu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 81 days.

(21) Appl. No.: 18/032,573

(22) PCT Filed: Jan. 25, 2022

(86) PCT No.: PCT/CN2022/073723
§ 371 (c)(1),
(2) Date: Apr. 19, 2023

(87) PCT Pub. No.: WO2022/206149
PCT Pub. Date: Oct. 6, 2022

(65) Prior Publication Data
US 2023/0386098 A1 Nov. 30, 2023

(30) Foreign Application Priority Data
Mar. 30, 2021 (CN) .......................... 202110345357.3

(51) Int. Cl.
G06T 7/90 (2017.01)
G06T 11/00 (2006.01)

(52) U.S. Cl.
CPC .............. *G06T 11/001* (2013.01); *G06T 7/90* (2017.01); *G06T 2207/20081* (2013.01); *G06T 2207/20084* (2013.01)

(58) Field of Classification Search
CPC ..................... G06T 11/001; G06T 7/90; G06T 2207/20081; G06T 2207/20084; H04B 17/382; G06N 3/045; G06N 3/08
See application file for complete search history.

(56) References Cited

U.S. PATENT DOCUMENTS 11,694,333 B1 * 7/2023 Knuffman ............ G06V 10/454
382/154
2020/0293875 A1 9/2020 Zhang et al.

FOREIGN PATENT DOCUMENTS

CN 106569044 A 4/2017
CN 106682234 A 5/2017
(Continued)

OTHER PUBLICATIONS

Ren, X.; Sun, M.; Zhang, X.; Liu, L. A Simplified Method for UAV Multispectral Images Mosaicking. Remote Sens. 2017, 9, 962. https://doi.org/10.3390/rs9090962 (Year: 2017).*
Dong Liu, et al., Spectrum Situation Completion Based on Model-Enhanced Generative Learning, 13th International Conference on Wireless Communications and Signal Processing, 2021.

*Primary Examiner* — William A Beutel
*Assistant Examiner* — Chris Alejandro Puntier
(74) *Attorney, Agent, or Firm* — Bayramoglu Law Offices LLC (57) ABSTRACT

A three-dimensional (3D) spectrum situation completion method and device based on a generative adversarial network includes performing graying and coloring preprocessing based on incomplete 3D spectrum situations from his- (Continued)

torical or empirical spectrum data obtained by a UAV through sampling a target region, obtaining three-channel incomplete 3D spectrum situation maps displayed in colors, forming a training set based on the incomplete 3D spectrum situation maps; training the generative adversarial network based on the training set and obtaining a trained generator network in the generative adversarial network, performing graying and coloring preprocessing based on a measured incomplete 3D spectrum situation obtained by the UAV through sampling a specified measurement region, obtaining a three-channel measured incomplete 3D spectrum situation map displayed in colors, and using the measured incomplete 3D spectrum situation map as input data to the generator network to obtain a three-channel measured complete 3D spectrum situation map displayed in colors.

14 Claims, 5 Drawing Sheets

(56) References Cited

FOREIGN PATENT DOCUMENTS

| | | |
|---|---|---|
| CN | 107945811 A | 4/2018 |
| CN | 109946512 A | 6/2019 |
| CN | 111431580 A | 7/2020 |
| CN | 112819082 A | 5/2021 |

* cited by examiner

THREE-DIMENSIONAL SPECTRUM SITUATION COMPLETION METHOD AND DEVICE BASED ON GENERATIVE ADVERSARIAL NETWORK

CROSS-REFERENCE TO THE RELATED APPLICATION

This application is the national phase entry of International Application No. PCT/CN2022/073723, filed on Jan. 25, 2022, which is based on and claims priority to Chinese Patent Application No. 202110345357.3, filed on Mar. 30, 2021, the disclosures of which are incorporated by reference herein in its entirety.

TECHNICAL FIELD

The present disclosure relates to the field of wireless communication technologies, specifically to a three-dimensional (3D) spectrum situation completion method and device based on a generative adversarial network.

BACKGROUND

Electromagnetic spectrum situation (i.e. radio frequency map) completion is a technique to complete the comprehensive situation of the entire electromagnetic environment in the spatial dimension by using discrete and incomplete spectrum data (such as received signal power) obtained through sampling. This technology enables limited radio monitoring equipment to obtain a complete electromagnetic situation. With the development of space-air-ground information network, traditional two-dimensional spectrum situation completion technology is difficult to meet the needs of three-dimensional electromagnetic situational awareness, and corresponding electromagnetic spectrum situation completion technology is urgently needed.

Some studies have been conducted on 3D spectrum situation completion, but UAV trajectories designed in these studies are very random and complex, which is difficult to achieve during actual measurement. Consequently, the pilot can hardly control the UAV to follow the aforementioned trajectories, and even the programmed automatic pilotage cannot follow the trajectories based on the actual environment (e.g., obstructions). In addition, the designed completion algorithms also require a plurality of known complete 3D spectrum situations, and this prior or a priori information is also difficult to obtain in practice. It should be noted that traditional two-dimensional spectrum situation completion algorithms, such as the inverse distance weighting (IDW) algorithm, may be extended to three dimensions, but the IDW algorithms assume that the spectrum data is only distance-dependent, which is not consistent with the physical model of the spectrum situation, thereby causing low precision in 3D spectrum situation completion. Therefore, in practice, when the UAV flies along the specified trajectories and samples spectrum situation data, the previous 3D spectrum situation completion schemes encounter challenges such as difficulty in obtaining the complete 3D spectrum situation and very little valid data.

In Chinese invention patent CN106682234A entitled "METHOD FOR ELECTROMAGNETIC SPECTRUM DISTRIBUTION PREDICTION AND DYNAMIC VISUALIZATION BASED ON SPATIAL INTERPOLATION" and disclosed on May 17, 2019 by China National Intellectual Property Administration, data from grid monitoring is aggregated according to time granularity, a Kriging spatial interpolation algorithm is used for processing monitored data in each time period to fit statistical relationships between the distance between monitoring sites and electromagnetic signal strength, and optimal unbiased interpolation prediction is performed on electromagnetic spectrum distribution data of an unknown area. However, this method cannot be easily applied in the case of insufficient data volume.

Chinese invention patent CN109946512A, entitled "DYNAMIC POWER ANALYSIS METHOD BASED ON FREQUENCY DOMAIN INTERPOLATION" and disclosed on Jun. 28, 2019 by China National Intellectual Property Administration, reduces errors caused by asynchronous sampling or non-integer period truncation of data through fast Fourier transform and calculating spectral interpolation coefficients, but the interpolation result has low precision.

Chinese invention patent CN112819082A, entitled "SATELLITE SPECTRUM SENSING DATA RECONSTRUCTION METHOD BASED ON DEEP LEARNING" and disclosed on May 18, 2021 by China National Intellectual Property Administration, can reconstruct the low-resolution frequency spectrum data into the high-resolution frequency spectrum data, such that the satellite-ground transmission data volume is effectively reduced, and the satellite-ground data transmission pressure is relieved. In this scheme, data reconstruction is achieved through model training by using historical high-resolution data, which is difficult to be applied in the absence of a priori rules.

SUMMARY

The purpose of the present disclosure is to provide a 3D spectrum situation completion method and device based on a generative adversarial network. The present disclosure is oriented to 3D spectrum situation completion scenarios in which a UAV performs sampling with or without specified trajectories to resolve the problems of the severe shortage of sampling data and lack of the complete 3D spectrum situation. The present disclosure can obtain a complete 3D distribution of power spectrum density by using incomplete, rather than complete, historical or empirical spectrum data, that is, the complete historical or empirical spectrum data is not required, and thus can effectively resolve the defects of traditional spectrum situation completion methods such as over-reliance on prior or a priori information, inability to achieve 3D completion, and low completion precision.

In order to achieve the above purpose, an embodiment of the present disclosure provides a 3D spectrum situation completion method based on a generative adversarial network, including:

performing graying and coloring preprocessing based on incomplete 3D spectrum situations (i.e. incomplete 3D radio frequency maps) from historical or empirical spectrum data obtained by a UAV through sampling a target region, obtaining three-channel incomplete 3D spectrum situation maps (i.e. three-channel incomplete 3D radio frequency maps) displayed in colors, and forming a training set based on the obtained three-channel incomplete 3D spectrum situation maps (i.e. three-channel incomplete 3D radio frequency maps) displayed in colors;

training the generative adversarial network based on the training set and obtaining a trained generator network in the generative adversarial network, where the generative adversarial network is configured with a sampling processing function, and the sampling processing function is used to perform, based on sampled and unsampled position points in the three-channel incomplete 3D spectrum situation maps (i.e. the three-channel incomplete 3D radio frequency maps) displayed in colors that are inputted into the generative adversarial network, sampling processing on a three-channel complete 3D spectrum situation maps (i.e. a three-channel complete 3D radio frequency maps) displayed in colors that are outputted by the generator network in the generative adversarial network; and performing graying and coloring preprocessing based on a measured incomplete 3D spectrum situation obtained by the UAV through sampling a specified measurement region, obtaining a three-channel measured incomplete 3D spectrum situation map displayed in colors, and using the three-channel measured incomplete 3D spectrum situation map as input data to the generator network to obtain a three-channel measured complete 3D spectrum situation map displayed in colors.

Specifically, the performing, based on sampled and unsampled position points in the three-channel incomplete 3D spectrum situation map displayed in colors that is inputted into the generative adversarial network, sampling processing on a three-channel complete 3D spectrum situation map displayed in colors that is outputted by the generator network in the generative adversarial network may include:

determining a numerical matrix, where the numerical matrix includes a first specified numerical column of the sampled position points and a second specified numerical column of the unsampled position points, and the first specified numerical column is different from the second specified numerical column; and calculating a Hadamard product of the numerical matrix and the three-channel complete 3D spectrum situation map displayed in colors.

Specifically, the graying and coloring preprocessing may include:

calculating a normalized value for the incomplete 3D spectrum situation (i.e. the incomplete 3D radio frequency map) based on incomplete historical or empirical spectrum data; and determining, based on the normalized value, a single-channel incomplete 3D spectrum situation map displayed in grayscale.

Specifically, the graying and coloring preprocessing may further include:

copying twice the single-channel incomplete 3D spectrum situation map (i.e. the single-channel incomplete 3D radio frequency map), obtaining a two-channel incomplete 3D spectrum situation map (i.e. a two-channel incomplete 3D radio frequency map);

expanding the single-channel incomplete 3D spectrum situation map (i.e. the single-channel incomplete 3D radio frequency map) by the two-channel incomplete 3D spectrum situation map (i.e. the two-channel incomplete 3D radio frequency map), obtaining a three-channel incomplete 3D spectrum situation map (i.e. a three-channel incomplete 3D radio frequency map) displayed in grayscale; and coloring with a specified color unsampled position points in the three-channel incomplete 3D spectrum situation map displayed in grayscale to obtain the three-channel incomplete 3D spectrum situation map displayed in colors, where the colors include the grayscale and the specified color.

Specifically, in the generative adversarial network, the input data of the generator network is configured as the three-channel incomplete 3D spectrum situation map displayed in colors; and output data of the generator network is used as the three-channel complete 3D spectrum situation map displayed in colors.

Specifically, in the generative adversarial network, the generator network includes an input-side 3D convolutional layer, two down-sampling module, six residual modules, two residual modules, and an output-side 3D convolutional layer;

the input data of the generator network is processed sequentially by the input-side 3D convolutional layer, the down-sampling module, the residual module, the up-sampling module, and the output-side 3D convolutional layer of the generator network; and the residual module of the generator network has a dilated convolutional layer.

Specifically, in the generative adversarial network, input data of a discriminator network is configured as the three-channel incomplete 3D spectrum situation map displayed in colors, or a three-channel complete 3D spectrum situation map after sampling processing.

Specifically, in the generative adversarial network, the discriminator network includes an input-side 3D convolutional layer, two down-sampling modules, three residual modules, and an output-side 3D convolutional layer;

the input data of the discriminator network is processed sequentially by the input-side 3D convolutional layer, the down-sampling module, the residual module, and the output-side 3D convolutional layer of the discriminator network; and the residual module of the discriminator network has a dilated convolutional layer.

Specifically, in the generative adversarial network, a hyperparameter set of the residual module of the discriminator network is used to input the output data of a specified number of channels to the output-side 3D convolutional layer of the discriminator network; and the output-side 3D convolutional layer of the discriminator network has a controlled hyperparameter set.

Specifically, in the generative adversarial network, an objective function of the generative adversarial network is configured with a gradient penalty term without a latent variable and with a weighted reconstruction loss; and calculation of the weighted reconstruction loss includes calculation of a Hadamard product of a weight and the three-channel incomplete 3D spectrum situation map displayed in colors, a Hadamard product of the weight and the three-channel complete 3D spectrum situation map displayed in colors, and a 1-Norm of a difference between the two Hadamard products.

Specifically, the training of the generative adversarial network may include:

sampling a real sample from the training set based on a configured training parameter; and performing the calculation on the real sample and a simulation sample after sampling processing based on a Wasserstein distance, to obtain a three-channel penalty 3D spectrum situation map displayed in colors, where the simulation sample after sampling processing is obtained after the real sample is processed by the generator network and sampling processing is performed on the real sample with the sampling processing function.

Specifically, in the generative adversarial network, the input data of the discriminator network is further configured as the penalty 3D spectrum situation map, and the output data of the discriminator network is represented with a matrix; and calculation of the gradient penalty term includes the calculation of a gradient of the output data of the discriminator network with respect to the penalty 3D spectrum situation map and a 2-norm of the gradient.

Specifically, the training of the generative adversarial network may further include:

determining an expression for the sampling processing function based on a specific distribution of sampled and unsampled position points in the real sample; and calculating, by using the expression and the training set, a gradient(s) of the objective function and/or the reconstruction loss with respect to the parameter.

An embodiment of the present disclosure provides a 3D spectrum situation completion device based on a generative adversarial network, including:

a preprocessing module configured to: perform graying and coloring preprocessing based on an incomplete 3D spectrum situation obtained by a UAV through sampling a target region, obtain a three-channel incomplete 3D spectrum situation map displayed in colors, and form a training set based on the obtained three-channel incomplete 3D spectrum situation map displayed in colors;

a training module configured to train the generative adversarial network based on the training set, and obtain a trained generator network in the generative adversarial network, where the generative adversarial network is configured with a sampling processing function, and the sampling processing function is used to perform, based on sampled and unsampled position points in the three-channel incomplete 3D spectrum situation map displayed in colors that is inputted into the generative adversarial network, sampling processing on a three-channel complete 3D spectrum situation map displayed in colors that is outputted by the generator network in the generative adversarial network; and a completion module configured to perform graying and coloring preprocessing based on a measured incomplete 3D spectrum situation obtained by the UAV through sampling a specified measurement region, obtain a three-channel measured incomplete 3D spectrum situation map displayed in colors, and use the three-channel measured incomplete 3D spectrum situation map as input data to the generator network to obtain a three-channel measured complete 3D spectrum situation map displayed in colors.

According to another aspect, an embodiment of the present disclosure provides an electronic device, including:

at least one processor; and a memory connected to the at least one processor.

The memory stores an instruction executable by the at least one processor, and the at least one processor executes the instruction stored in the memory to implement the method described above.

According to still another aspect, an embodiment of the present disclosure provides a computer-readable storage medium storing a computer instruction. When the computer instruction runs on a computer, the computer is enabled to execute the method described above.

Other features and advantages of examples of the present disclosure are described in detail in the subsequent specific implementation part.

BRIEF DESCRIPTION OF THE DRAWINGS

The accompanying drawings are intended to provide a further understanding of the examples of the present disclosure and constitute a part of the specification. The accompanying drawings and the following specific implementations are intended to explain examples of the present disclosure, rather than to limit the examples of the present disclosure. In the accompanying drawings.

DETAILED DESCRIPTION OF THE EMBODIMENTS

Specific implementations of the examples of the present disclosure are described in detail below by referring to the accompanying drawings. It should be understood that the implementations described herein are merely intended to illustrate and interpret the examples of the present disclosure, rather than to limit the examples of the present disclosure.

With the advent of the era of big data and the rapid development of artificial intelligence, deep learning has attracted wide interest among scholars and has promoted the organic integration of wireless communication and artificial intelligence. The generative adversarial network as a new deep learning framework has a high potential for development and a broad prospect of application. Based on the game theory, the generative adversarial network can output generative data (or "fake" data) comparable to real training data through iterative adversarial training of a pair of neural networks. The pair of neural networks is a generator network and a discriminator network. Based on training data obtained from real data, the generator network generates simulation samples with the same specifications as the real samples, while the discriminator network differentiates the simulation samples from the real samples by comparing the differences between them. In this way, higher-order correlations of observed or visible data can be captured without information about the target class labels. Thus, in the embodiments of the present disclosure, the generative adversarial network may be applied in 3D spectrum situation completion to learn the data distribution of the real complete 3D spectrum situation or the mapping relationship between the incomplete 3D spectrum situation and the complete 3D spectrum situation.

In the embodiments of the present disclosure, the spectrum situation may refer to distribution data of the received signal power corresponding to the spatial position points and frequencies in the electromagnetic environment, and the spectrum situation may be presented in the form of a map. The spectrum situation map may be a radio frequency map.

In the embodiments of the present disclosure, the specified trajectories may be some easily achievable trajectories. For example, the UAV flies around at different altitudes.

Embodiment 1

An embodiment of the present disclosure provides a 3D spectrum situation completion method based on a generative adversarial network. The 3D spectrum situation completion method may include the following steps.

S1) Graying and coloring preprocessing are performed based on an incomplete 3D spectrum situation obtained by a UAV through sampling a target region, a three-channel incomplete 3D spectrum situation is obtained, and a training set is obtained based on the obtained three-channel incomplete 3D spectrum situation.

S2) The generative adversarial network is generated based on the training set, and a trained generator network in the generative adversarial network is obtained, where the generative adversarial network is configured with a sampling processing function. The sampling processing function is used to perform sampling processing on a three-channel complete 3D spectrum situation that is outputted by the generator network in the generative adversarial network based on sampled and unsampled position points in the three-channel incomplete 3D spectrum situation that is inputted to the generative adversarial network.

S3) Graying and coloring preprocessing are performed based on a measured incomplete 3D spectrum situation obtained by the UAV through sampling a specified measurement region, a three-channel measured incomplete 3D spectrum situation is obtained, and the three-channel measured incomplete 3D spectrum situation is used as input data to the generator network to obtain a three-channel measured complete 3D spectrum situation.

Figure 1:
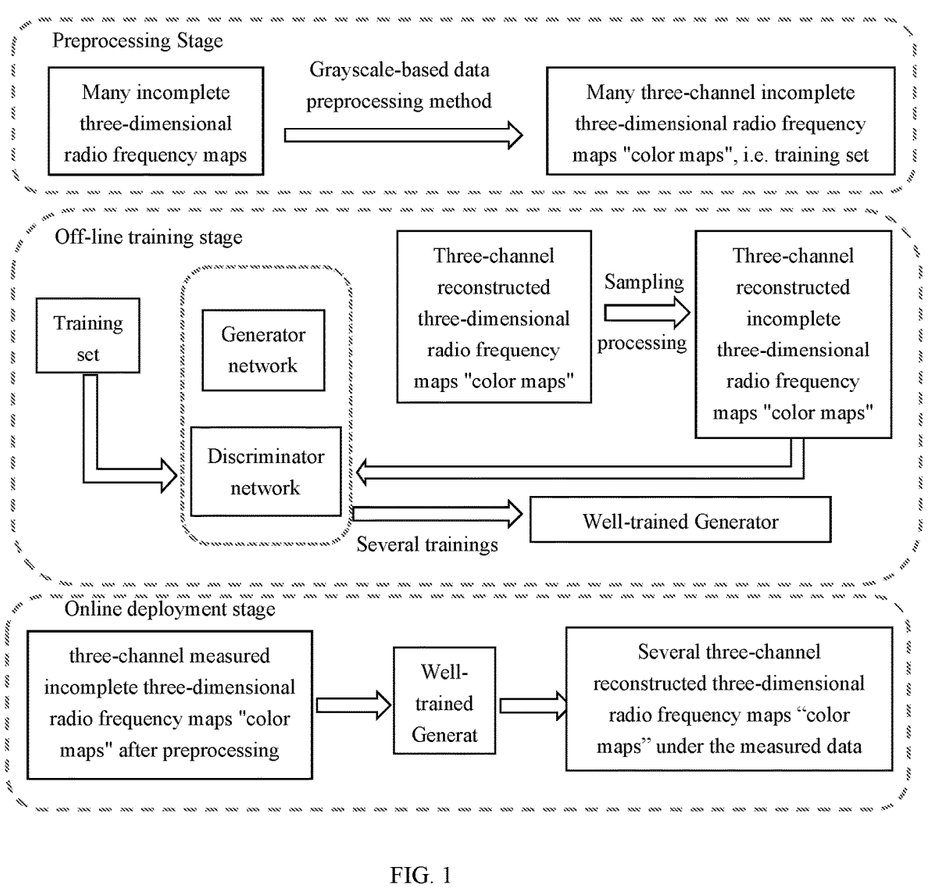
FIG. 1 is a schematic diagram of a main procedure of a 3D spectrum situation completion method based on a generative adversarial network according to an embodiment of the present disclosure.

In this embodiment of the present disclosure, with reference to FIG. 1, the steps in the above method may be performed in the following sequence of stages: a preprocessing stage, an off-line training stage, and an online deployment stage. Further, the method first executes step S1) in the preprocessing stage (which may be considered the first stage) and then step S2) in the off-line training stage (which may be considered the second stage) or step S3) in the online deployment stage (which may be considered the third stage). The method specifically includes the following steps.

In the first stage, data preprocessing including graying and coloring are performed on multiple incomplete 3D spectrum situations of the target region that are obtained through UAV sampling to improve the training speed of the generative adversarial network and the 3D spectrum situation completion performance.

First, when incomplete historical or empirical spectrum data of the 3D target region A is known, each incomplete 3D spectrum situation $\Psi(x,f), \forall x \in A$ in the sampled data is normalized. Details are as follows.

The maximum received signal power (value) in the incomplete historical or empirical spectrum data is compared with the maximum received signal power in the incomplete 3D spectrum situation, and the minimum received signal power in the incomplete historical or empirical spectrum data is compared with the minimum received signal power in the incomplete 3D spectrum situation.

The larger of the two maximum values and the smaller of the two minimum values are used as reference values for the min-max normalization of the incomplete 3D spectrum situation.

A normalized value of each incomplete 3D spectrum situation is calculated with the min-max normalization function, and the normalized value is directly used as a color value in a specified color mode, for example, used as a gray value or gray level in this case.

Therefore, a single-channel incomplete 3D spectrum situation map may be obtained through conversion, which may be expressed in color channels (RGB, YVU, or the like), and the color in the single channel in this case is grayscale. The grayscale may include gray, black, and white, and the single-channel incomplete 3D spectrum situation map displayed in grayscale may be referred to as a single-channel incomplete 3D spectrum situation "grayscale map". It should be noted that the incomplete historical or empirical spectrum data may be the incomplete 3D spectrum situation obtained by the UAV through sampling the target region A, and the target region A may be in a specified size. In this embodiment of the present disclosure, the color may be a color value or a color value range in a specified color mode. For ease of color information expression of the spectrum situation map obtained through conversion, the following notation is used in the embodiments of the present disclosure.

A single-channel incomplete 3D spectrum situation map displayed in grayscale is denoted as a single-channel incomplete 3D spectrum situation "grayscale map".

A three-channel incomplete 3D spectrum situation map displayed in colors is denoted as a three-channel incomplete 3D spectrum situation "color map".

A three-channel complete 3D spectrum situation map displayed in colors is denoted as a three-channel complete 3D spectrum situation "color map".

A single-channel measured incomplete 3D spectrum situation map displayed in grayscale is denoted as a single-channel measured incomplete 3D spectrum situation "grayscale map".

A three-channel measured incomplete 3D spectrum situation map displayed in colors is denoted as a three-channel measured incomplete 3D spectrum situation "color map".

A three-channel measured complete 3D spectrum situation map displayed in colors is denoted as a three-channel measured complete 3D spectrum situation "color map".

Then, the single-channel incomplete 3D spectrum situation "grayscale map" may be copied twice, and the single-channel incomplete 3D spectrum situation "grayscale map" and two copied single-channel incomplete 3D spectrum situation "grayscale maps" may be expanded to obtain a three-channel incomplete 3D spectrum situation "grayscale map".

Finally, unsampled position points in the three-channel incomplete 3D spectrum situation "grayscale map" may be colored in red (or another color other than black, white, and gray) to obtain the three-channel incomplete 3D spectrum situation "color map", denoted as Y. Thus, multiple three-channel incomplete 3D spectrum situation "color maps" displayed in colors may be obtained in the preprocessing stage, and the multiple three-channel incomplete 3D spectrum situation "color maps" displayed in colors are used as the training set. Red or another color other than black, white, and gray is also a color value in the specified color mode.

In the second stage, the generative adversarial network is trained through sampling processing based on the above training set to achieve unsupervised learning of a mapping relationship between an incomplete 3D spectrum situation map and a complete 3D spectrum situation map. It should be noted that the generative adversarial network used in this stage in this embodiment of the present disclosure may be the 3D-SSCGAN proposed in the embodiments of the present disclosure.

On the one hand, the input data of the generator network in 3D-SSCGAN is the three-channel incomplete 3D spectrum situation "color map" $\Psi$, and the output data is a three-channel complete 3D spectrum situation "color map" $\hat{\Psi} \sim p_g(\hat{\Psi})$.

On the other hand, input data of the discriminator network in 3D-SSCGAN is the three-channel incomplete 3D spectrum situation "color map" $\Psi$ or a complete 3D spectrum situation "color map" $\hat{\Psi}_s = F_s(\hat{\Psi})$ after sampling processing. A sampling processing function $F_s(\cdot)$ is used for sampling processing on the three-channel complete 3D spectrum situation "color map" $\hat{\Psi}$ based on a UAV sampling situation shown by the three-channel incomplete 3D spectrum situation "color map" $\Psi$. The sampling processing may be the same as the UAV sampling situation. For example, in an example disclosed in this embodiment of the present disclosure, the UAV sampling situation shown by the input three-channel incomplete 3D spectrum situation "color map" may be determined and represented by defining a numerical matrix M. In the matrix, values at the sampled position points are $[1,1,1]^T$ and values at the unsampled position points are $[0,0,0]^T$ (because in this case, the "color map" has a dimension of $3 \times N_L \times N_W \times N_H$, and a value at each position $x \in R^3$ is a vector with three elements). Therefore, the sampling processing function may be in a form of $F_s(\cdot) = M \odot$, for example, $F_s(\hat{\Psi}) = M \odot \hat{\Psi}$. $\hat{\Psi}$ is the three-channel complete 3D spectrum situation "color map", and $\odot$ is a Hadamard product (that is, element-wise multiplication). In this embodiment of the present disclosure, the sampling situation may be understood as a specific distribution of sampled and unsampled position points.

Output data of the discriminator network may be a matrix that can characterize discriminating results. Therefore, the real and simulation samples of 3D-SSCGAN are the three-channel incomplete 3D spectrum situation "color map" and the three-channel complete 3D spectrum situation "color map", that is, $\Psi$ and $\hat{\Psi}_s = F_s(\hat{\Psi})$, respectively. Therefore, through the sampling processing, the generator network and the discriminator network can achieve unsupervised learning through adversarial training to obtain a trained generator network.

In the third stage, the trained generator network may be deployed directly for the spectrum situation application in the actual 3D electromagnetic spectrum space to accurately complete the incomplete 3D spectrum situation obtained by the UAV, such that the received power distribution data of a target region B (the specified measurement region) can be obtained. The target region B may be the target region A, or another region having the same size as a scaling relationship with the aforementioned region. In this case, the input data of the generator network is the preprocessed three-channel measured incomplete 3D spectrum situation map "color map", and the output data is the three-channel measured complete 3D spectrum situation map "color map".

Figure 2:
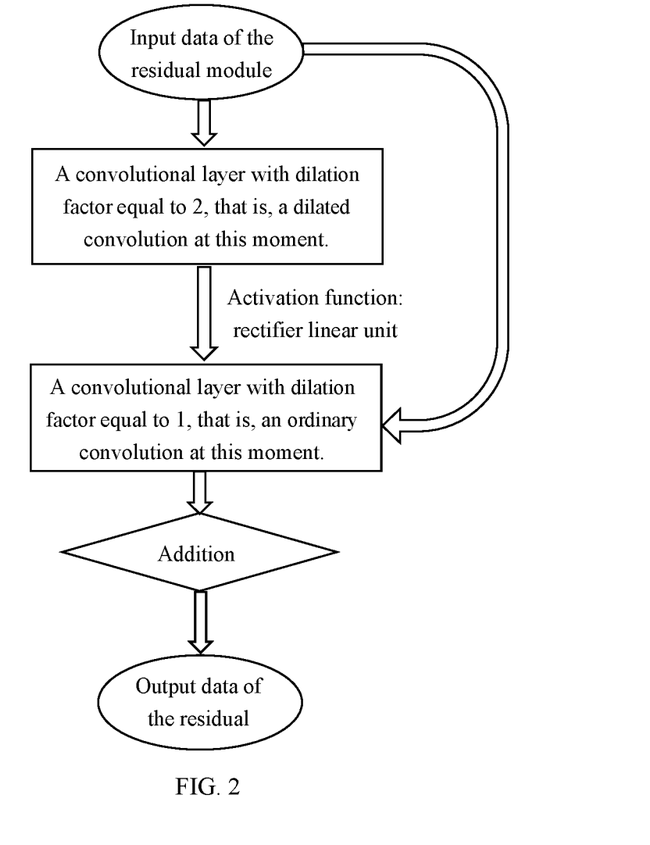
FIG. 2 is a schematic diagram of an exemplary residual module embedded with dilated convolution according to an embodiment of the present disclosure.
Figure 3:
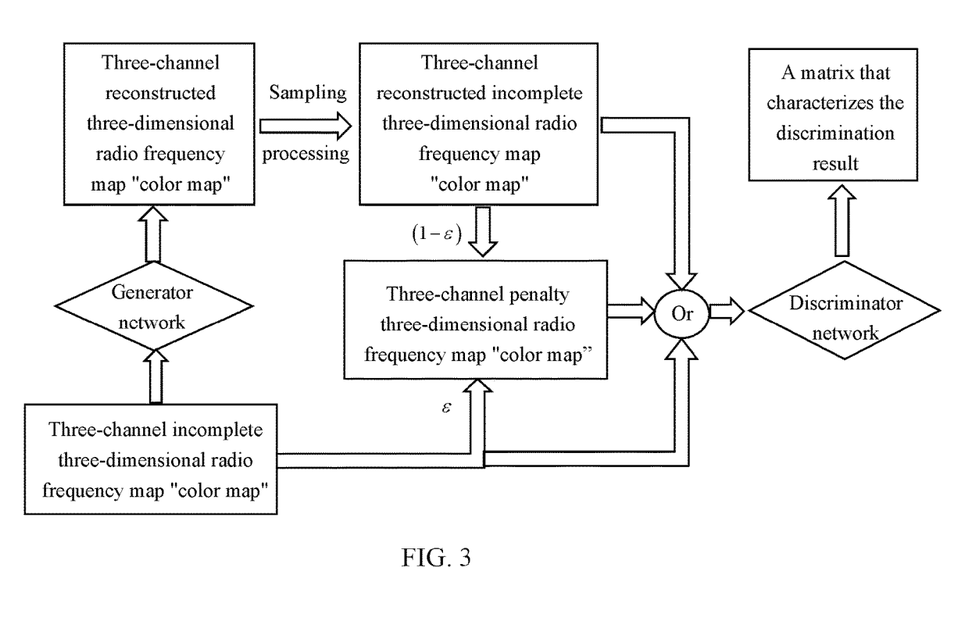
FIG. 3 is a schematic diagram of an output architecture of a 3D spectrum situation completion generative adversarial network (3D-SSCGAN) according to an embodiment of the present disclosure.

With reference to FIG. 2 and FIG. 3, in further embodiments, in the second and third stages, 3D-SSCGAN in this embodiment of the present disclosure has the following features compared with a generative adversarial network composed of ordinary 3D convolutional layers.

1) The residual module is introduced to increase the number of 3D convolutional layers in the generative adversarial network to improve the feature extraction capability of the generative adversarial network for the incomplete 3D spectrum situation, thereby resolving the problem of very little valid data in the known incomplete 3D spectrum situation. The residual module constructs information paths between different 3D convolutional layers through residual connection to avoid the network degradation caused by the increase of 3D convolutional layers.

2) The dilated convolution is introduced to increase the receptive fields of the 3D convolutional layers in the generative adversarial network to compensate for information loss caused by the reduced data size during the down-sampling process to cooperate with the unsupervised learning in the off-line training stage to cope with the challenge that the complete 3D spectrum situation is unknown (but the incomplete 3D spectrum situation has to be completed). It should be noted that the dilated convolution is embedded in the residual module, as shown in FIG. 2. A dilated convolutional layer is a neural network convolutional layer with a specified dilated factor, and the dilated convolutional layer performs convolution operations when the dilated factor satisfies $d_c > 1$ while the dilated factor of the normal convolutional layer is $d_c = 1$. Therefore, when the dilated convolution is not used, it means that dilated factors of the convolutional layers are all set to 1. In this case, receptive fields of the convolutional layers cannot increase, that is, a spectrum situation of a larger range cannot be processed.

3) In the generative adversarial network, a block-oriented (PatchGAN) mechanism is introduced into the discriminator network to extract locally effective data features in the incomplete 3D spectrum situation. In this case, PatchGAN means that the discriminator network of the generative adversarial network no longer outputs a real number that characterizes the discriminator network's discriminating result for the whole input spectrum situation map but outputs a matrix that characterizes discriminating results for several blocks of the input spectrum situation map. Therefore, when PatchGAN is not used, it means that the discriminator network outputs only one real number. Consequently, it is difficult to focus on the local texture information of the input spectrum situation map, but only the overall texture information is focused on. Thus, PatchGAN can be used to meet the challenge of very little valid data in the known incomplete 3D spectrum situation to enhance the discriminating capability, thereby improving the generative capability of the generative adversarial network. In an example disclosed in this embodiment of the present disclosure, this can be realized by using the architecture of the discriminator network in this embodiment of the present disclosure through controlling a hyperparameter set of the output-side 3D convolutional layer of the discriminator network.

4) In the generative adversarial network, a Wasserstein distance and a parameter with gradient penalty terms are introduced to the objective function to alleviate the training instability exacerbated by the two major challenges of very little valid data and the unknown complete 3D spectrum situation during the training of the generative adversarial network.

5) In the generative adversarial network, a latent variable is removed from the objective function to learn the mapping relationship between the incomplete 3D spectrum situation and the complete 3D spectrum situation to resolve the problem that the 3D spectrum situation data distribution cannot be learned due to the unknown complete 3D spectrum situation.

6) A weighted reconstruction loss is introduced into the objective function to reflect the importance of the radiation source for 3D spectrum situation completion and corresponding spectrum situation application, thus addressing the challenge of very little valid data in the known incomplete 3D spectrum situation.

In further embodiments, when the weighted reconstruction loss is introduced to meet the challenge of very little valid data in the known incomplete 3D spectrum situation, the weighted reconstruction loss specifically has the following meaning.

The weighted reconstruction loss mainly uses a loss function $L_1$ to evaluate a difference between the three-channel incomplete and complete 3D spectrum situation "color maps", that is, a difference between $\tilde{\Psi}$ and $\tilde{\Psi}_s = F_s(\hat{\Psi})$. The physical meaning of the weight of the weighted reconstruction loss is that if the received power at a position is larger, the position is more susceptible to the attention of the 3D spectrum situation completion and the corresponding spectrum situation application, such that the corresponding weight of the position in the incomplete 3D spectrum situation "color map" is larger. The weighted reconstruction loss $V_{L1}(G)$ is calculated with the following equation.

$$V_{L1}(G) = \mathbb{E}_{\Psi \sim p_{data}(\Psi)}[\|W_{\tilde{\Psi}} \odot \tilde{\Psi} - W_{\tilde{\Psi}} \odot F_s(G(\tilde{\Psi};\theta_g))\|_1] \quad (1)$$

$\hat{\Psi} = F_s(G(\tilde{\Psi};\theta_g))$ is the three-channel complete 3D spectrum situation "color map" processed by the sampling processing function, the weight $W_{\tilde{\Psi}}$ is a weight of the normalized three-channel incomplete 3D spectrum situation "color map", $p_{data}$ is the real data distribution, $\odot$ is the Hadamard product, $\mathbb{E}_{x \sim p(x)}[f(x)]$ is an expectation of $f(x)$ with respect to $p(x)$, G is the generator network, $\theta_g$ is a parameter of the generator network, and $\|\cdot\|_1$ is a 1-norm. Thus, the parameter $\theta_g$ of the generator network may be updated by minimizing $V_{L1}(G)$ during the training process.

In further embodiments, the training objective of 3D-SSCGAN is calculated with the following equation.

$$\underset{\theta_g}{\text{Min}}\, \underset{\theta_d}{\text{max}}\, (V(D, G) + V_{L1}(G)) = \quad (2)$$

$$\mathbb{E}_{\Psi \sim p_{data}(\Psi)}[D(\tilde{\Psi};\theta_d) - D(F_s(G(\tilde{\Psi};\theta_g));\theta_d)] +$$

$$\lambda_{L1} \mathbb{E}_{\Psi \sim p_{data}(\Psi)}[\|W_{\tilde{\Psi}} \odot \tilde{\Psi} - W_{\tilde{\Psi}} \odot F_s(G(\tilde{\Psi};\theta_g))\|_1] -$$

$$\lambda \mathbb{E}_{\Psi' \sim p_{gp}(\Psi')}[(\|\nabla_{\Psi'} D(\hat{\Psi}';\theta_d)\|_2 - 1)^2].$$

D is the discriminator network, $\nabla_x y$ is the gradient of y with respect to x, $\lambda_{L1}$ is a reconstruction loss factor, $\lambda$ is a Wasserstein penalty factor, $\theta_d$ is a parameter of the discriminator network, and $\|\cdot\|_2$ is a 2-norm.

Further, V(D,G) is the objective function characterizing the adversarial nature of the generative adversarial network, to be specific, the mapping relationship between the incomplete 3D spectrum situation and the complete 3D spectrum situation is gradually learned by training based on the adversarial loss. The reconstruction loss $V_{L1}(G)$ further enhances the learning capability, such that the sum of V(D,G) and $V_{L1}(G)$ is the total objective function of 3D-SSCGAN. It should be noted that the ordinary generative adversarial network uses the latent variable to learn the target distribution. However, since the 3D spectrum situation data distribution is unknown, this random variable is removed from the objective function to better learn the above mapping relationship.

Further, based on the Wasserstein distance (which describes the distance between distributions), the three-channel penalty 3D spectrum situation "color map" $\hat{\Psi}'$ is calculated from the real sample $\tilde{\Psi}$ and the simulation sample $\tilde{\Psi}_s$ after sampling processing, and $p_{gp}(\hat{\Psi}')$ is the corresponding distribution. Specifically, the sample $\hat{\Psi}'$ is obtained by summing two parts: one is obtained by multiplying the real sample $\tilde{\Psi}$ by a random number $\varepsilon$ subject to a uniform distribution U(0,1), and the other is obtained by multiplying the simulation sample $\tilde{\Psi}_s$ by $(1-\varepsilon)$. It should be noted that, although the discriminator network is designed to discriminate the difference between the three-channel incomplete 3D spectrum situation "color map" and the three-channel complete 3D spectrum situation "color map", because the penalty 3D spectrum situation "color map" $\hat{\Psi}'$ introduced also needs to be input to the discriminator network, the input data of the discriminator network herein may be considered as the sample $\hat{\Psi}'$, $\tilde{\Psi}_s$, or $\tilde{\Psi}$. In summary, the input and output mechanism of 3D-SSCGAN is shown in FIG. 3.

In further embodiments, the specific steps of the training algorithm of 3D-SSCGAN are as follows.

1) The number $N_{epoch}$ of training rounds, a batch training size $N_{batch}$, the number $N_{train}$ of sample spectrum situations in the training set, and the number $N_{dis}$ of alternating frequencies of the discriminator network relative to the generator network are set. The samples in the training set are multiple three-channel incomplete 3D spectrum situation "color maps" $\tilde{\Psi}$ obtained in the preprocessing stage.

2) A real sample $\{\tilde{\Psi}^{(1)}, \tilde{\Psi}^{(2)}, \ldots, \tilde{\Psi}^{(N_{batch})}\}$ is sampled from the training set, the UAV sampling situation is obtained from the real sample, an expression of the function $F_s(\cdot)$ is determined by specifying the numerical matrix as described above, the gradient of the objective function V(D,G) with respect to the parameter $\theta_d$ is determined, and $\theta_d$ is updated.

3) A real sample $\{\tilde{\Psi}^{(1)}, \tilde{\Psi}^{(2)}, \ldots, \tilde{\Psi}^{(N_{batch})}\}$ is sampled from the training set, the UAV sampling situation is obtained from the real sample, an expression of the function $F_s(\cdot)$ is determined by specifying the numerical matrix as described above, the gradients of the objective functions V(D,G) and $V_{L1}(G)$ with respect to the parameter $\theta_g$ are determined, and $\theta_g$ is updated.

4) Updating is cycled for a total of $N_{dis}$ times.

5) Iteration is cycled for a total of $(N_{train}/N_{batch})$ times.

6) Training is cycled for a total of $N_{epoch}$ times.

7) The cycle ends, and the trained generator network and discriminator network are obtained.

Figure 4:
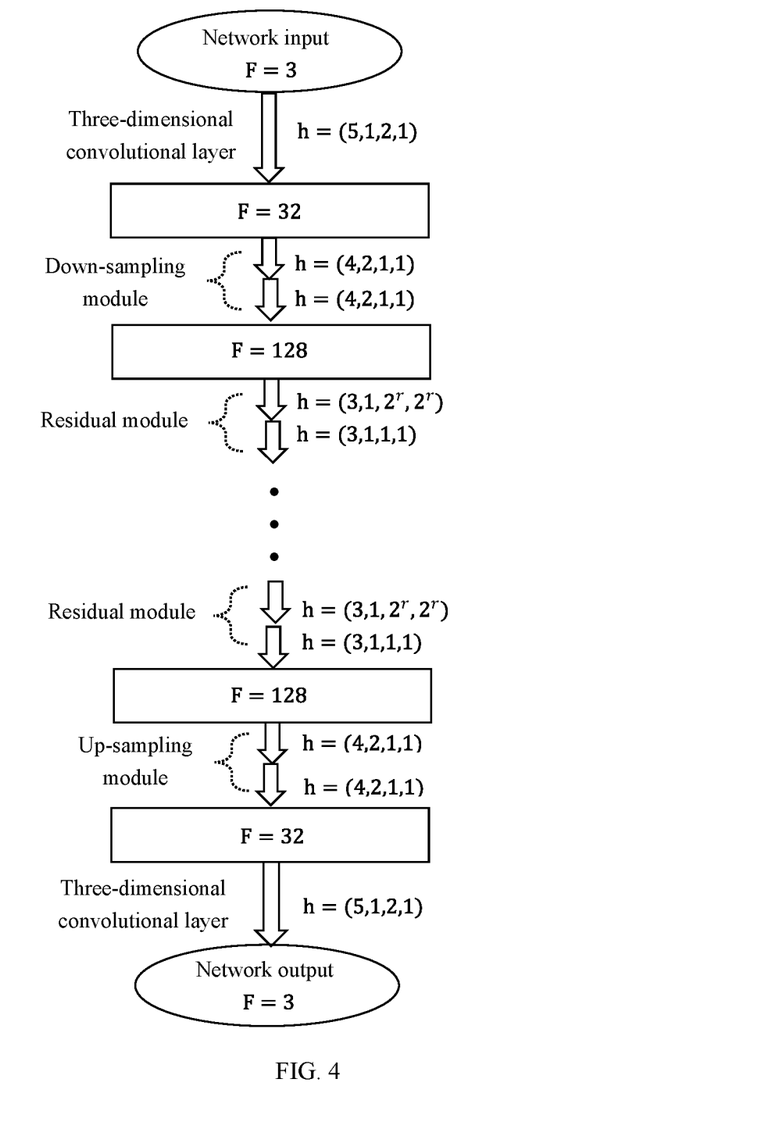
FIG. 4 is a schematic architectural diagram of a generator network in a 3D-SSCGAN according to an embodiment of the present disclosure.

With reference to FIG. 4, in further embodiments, the specific steps of an architecture construction process of the generator network in 3D-SSCGAN are as follows. First, a 3D convolutional layer with a hyperparameter set $h=(k,s_C, p_C,d_C)$ of (5,1,2,1) is used to perform feature extraction and processing on the input sample, that is, the three-channel incomplete 3D spectrum situation "color map", to keep the same data size and but increase the number F of channels to 32, wherein k×k indicates the convolutional kernel size of the 3D convolutional layer or 3D transpose convolutional layer, $s_C$ indicates a stride of the convolutional kernel, $p_C$ indicates the number of 0 padding layers, and $d_C$ indicates the dilated factor of the dilated convolution or normal convolution.

Further, output data of 32 channels of the convolutional layer is inputted to two sequentially connected 3D convolutional layers with a hyperparameter set h of (4,0.2.1.1), and thus the feature extraction is performed twice to reduce the data size but double the number F of channels. This part is referred to as a down-sampling module.

Further, the output data of 128 channels of the down-sampling module is inputted into six sequentially connected residual modules as shown in FIG. 2, that is, the feature paths are connected to better extract the effective features from the very little data. It should be noted that the hyperparameter sets h of the two 3D convolutional layers in the residual module are (3,1,2',2') and (3,1,1,1) respectively, where r is an index of the residual module. In addition, each 3D convolutional layer does not change the data size and the number of channels.

Further, the output data of 128 channels of the last residual module mentioned above is inputted into two sequentially connected 3D transpose convolutional layers with the hyperparameter sets h of (4,2,1,1) for twice recovery processing to increase the data size and half the F number of channels, that is, the data size of the output data is the same as the size of the input incomplete 3D spectrum situation "color map". Therefore, this part is referred to as the up-sampling module.

Finally, the output data of 32 channels of the up-sampling module is inputted into a 3D convolutional layer with a hyperparameter set h of (5,1,2,1) for final feature extraction and data fine-tuning to keep the data size unchanged but decrease the number F of channels to 3. In this way, the generator network of 3D-SSCGAN outputs the three-channel complete spectrum situation "color map".

Therefore, a schematic architectural diagram of the generator network in 3D-SSCGAN is as shown in FIG. 4. The arrow indicates a 3D convolutional layer or a 3D transpose convolutional layer with the hyperparameter set $h=(k,s_C,p_C,d_C)$, while the box indicates output data of a module or a 3D convolutional layer (the number of channels is F). In addition, a linear rectification unit (that is, ReLU function) is used as an activation function within each 3D convolutional layer and 3D transpose convolutional layer.

Figure 5:
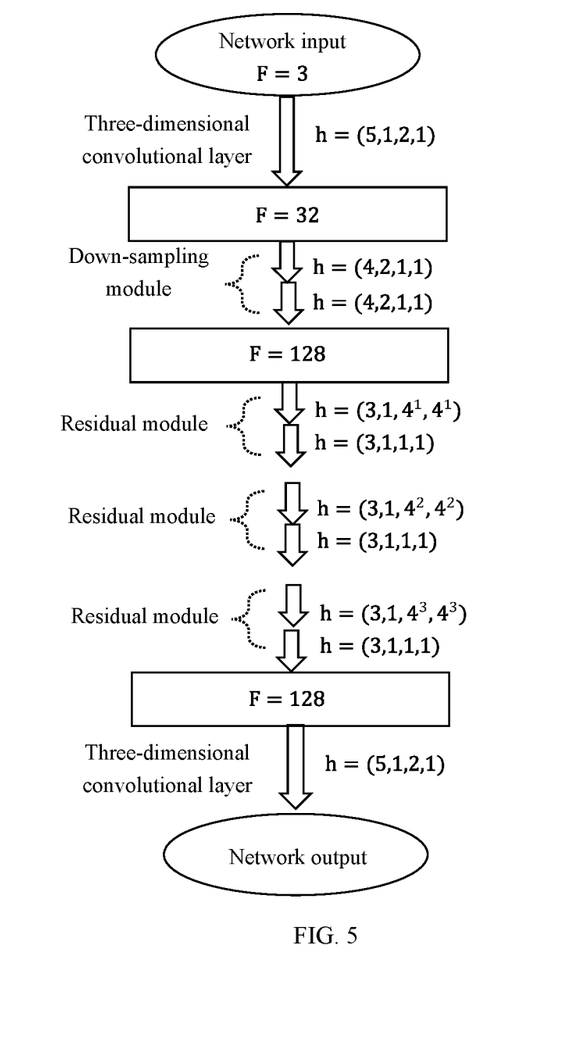
FIG. 5 is a schematic architectural diagram of a discriminator network in a 3D-SSCGAN according to an embodiment of the present disclosure.

With reference to FIG. 5, in further embodiments, the specific steps of an architecture construction process of the discriminator network in 3D-SSCGAN are as follows.

First, the basic structure of the discriminator network is set to be the same as the first half of the generator network. Therefore, feature extraction is performed on the input sample of the discriminator network sequentially by a 3D convolutional layer (with a hyperparameter set h of (5,1,2,1)), a down-sampling module consisting of two sequentially connected 3D convolutional layers (both with a hyperparameter set h of (4,2,1,1)), and three sequentially connected residual modules as shown in FIG. 2 (hyperparameter sets h of two 3D convolutional layers are (3,1,4',4') and (3,1,1,1), respectively). In addition, the output data of 128 channels of the last residual module is inputted into a 3D convolutional layer with a hyperparameter set h of (5,1,2,1) to realize a block-oriented structure of the generative adversarial network. In this way, the discriminator network in 3D-SSCGAN outputs a matrix characterizing discriminating results. Thus, a schematic architectural diagram of the discriminator network in 3D-SSCGAN is as shown in FIG. 5, and the linear rectification unit is still used for activation.

This embodiment of the present disclosure can perform data preprocessing operations including graying and coloring and sampling processing with the sampling processing function on multiple incomplete 3D spectrum situations in the historical or empirical spectrum data to achieve unsupervised learning of the mapping relationship between the incomplete 3D spectrum situation and the complete 3D spectrum situation by using 3D-SSCGAN. Prior complete historical or empirical spectrum data is not needed, thus avoiding the problem that the UAV following specified or unspecified trajectories obtains too little valid data to complete the 3D spectrum situation, thus meeting the challenges of unknown complete 3D spectrum situation (but the incomplete 3D spectrum situation needs to be completed) and very little valid data in the known incomplete 3D spectrum situation. In this way, deployment can be implemented for spectrum situation application in practice to present the received power distribution with high precision.

When the UAV performs sampling following specified or unspecified trajectories, 3D-SSCGAN in this embodiment of the present disclosure can complete the incomplete 3D spectrum situation with situation completion precision much higher than that of the traditional IDW method, and deployment can be implemented in the actual 3D electromagnetic spectrum space when the random received power distribution in the actual deployment environment is the same as or different from the random received power distribution in the training set.

Embodiment 2

This embodiment of the present disclosure has the same inventive concept as Embodiment 1. This embodiment of the present disclosure discloses some examples of the incomplete 3D spectrum situation completion method in Embodiment 1. It is understood that the following examples are not the only implementations and should not limit the present disclosure, and other numerical values and implementation operations may be performed based on the effects of testing or use. The following describes an example in which the 3D target region A has a size of L×W×H=240m×240m×80m and is rasterized into $N_L \times N_W \times N_H = 48 \times 48 \times 16$ rasters (e.g., pixels).

In this example, a UAV flies and performs sampling following specified trajectories, which may be set as follows: The UAV circles 16 times with random radius at different altitudes with equal intervals of 5 m to sample the spectrum data through a radio monitoring device mounted on the UAV. In addition, the number $N_T$ of radiation sources, or primary users, in the target region A is randomly selected from 1~5, and the sampling rate of the UAV following the specified trajectories is α≈3.8%. Moreover, a reference distance for calculating a signal propagation loss is $d_0$=0.01 km, and the operating frequencies of the radiation source and the radio monitoring device mounted on the UAV satisfy f∈(25 MHz, 125 MHz).

For the proposed 3D spectrum situation completion algorithm based on the generative adversarial network, $N_{train}$=30000 and $N_{test}$=10000 incomplete 3D spectrum situations $\Psi(x,f), \forall x \in A$ are set as training data and test data of the generative adversarial network, respectively. The two parts of data are subjected to grayscale-based data preprocessing to obtain a training set and a test set. It should be noted that the test set is used to simulate or represent the actual deployment environment of the proposed 3D spectrum situation completion algorithm.

Further, since the generative adversarial network performs unsupervised learning based on the incomplete 3D spectrum situation and only requires the UAV to perform multiple times of sampling in a 3D electromagnetic spectrum space to obtain the training data or test data, the performance of the algorithm can be evaluated when training data distribution, that is, random received power distribution $p_{t\_s}$ in the training set, is the same as or different from test data distribution, that is, random received power distribution $p_{d\_s}$ in the actual deployment environment. Specifically, a path loss factor n=6 and noise power $\sigma^2=10^{-5}$ mw in the test data are set first. Therefore, if the random received power distribution $p_{t\_s}=p_{d\_s}$, parameters of the training data is kept the same as those of the test data, that is, the path loss factor n=6 and the noise power $\sigma^2=10^{-5}$ mw. If the random received power distribution $p_{t\_s} \neq p_{d\_s}$, parameters of every 10000 sets of data in the training data are set to n=8, $\sigma^2=10^{-5}$, n=4, $\sigma^2=10^{-5}$, and n=4, $\sigma^2=10^{-3}$. A transmitting frequency range of the radiation source is set to $f_{max}-f_{min}$=25 MHz, while transmitting power (unit: dBm) is randomly selected from the vector [18.3, 26.7, 29.4, 30, 30, 30, 29.4, 26.7, 18.3].

Further, for the proposed 3D-SSCGAN, the learning rate of a generator network and a discriminator network is set to 10000, a batch training size is set to $N_{batch}$=16, the maximum number of training rounds $N_{epoch}$ is set to 100, the number of alternating frequencies of the discriminator network relative to the generator network is set to $N_{dis}$=2, a penalty factor is set to λ=10, and $λ_{L1}$=1000.

Further, the mean square error (MSE) is used to evaluate the situation completion performance of each set of training/test data, which is calculated as follows:

$$MSE = \frac{1}{N_L * N_W * N_H} \sum_{x \in A} (\Psi(x, f) - \hat{\Psi}(x, f))^2. \quad (3)$$

The complete 3D spectrum situation $\Psi(x,f), \forall x \in A$ is used only for calculation of the MSE and not for the off-line training and online deployment stages of the proposed algorithm. In addition, a training error and a test error respectively indicate an average MSE of all training data in the training set and an average MSE of all test data in the test set.

First, the completion performance of the proposed 3D spectrum situation completion algorithm based on the generative adversarial network is compared with that of the traditional IDW algorithm in two generative adversarial network training scenarios in which random received power distributions $p_{t\_s}$ and $p_{d\_s}$ are the same or different, where the UAV performs sampling for 16 circles following the specified trajectories at equally spaced altitudes and a power parameter of the IDW algorithm is $n_p$=2.

Based on a completion result of the 3D spectrum situation in randomly selected test data (the distribution in this test satisfies $p_{t\_s}=p_{d\_s}$), it can be learned that the complete 3D spectrum situation of the proposed algorithm is almost indistinguishable from the original complete 3D spectrum situation, while the complete 3D spectrum situation of the IDW algorithm is much different. That is, in this example, the proposed algorithm obtains a complete result better than the IDW algorithm.

Further, test errors of the proposed algorithm and the traditional IDW algorithm in different training rounds are compared based on spectrum situation completion results for the test data of the traditional IDW algorithm and the proposed algorithm in different generative adversarial network training scenarios (that is, the distributions $p_{t\_s}=p_{d\_s}$ and $p_{t\_s} \neq p_{d\_s}$). It can be learned from the comparison results that the 3D spectrum situation completion performance of the proposed algorithm converges gradually with the increase of training rounds regardless of the training data settings, and the test errors during convergence are much smaller than those of the IDW algorithm. Therefore, the situation completion performance of the proposed algorithm is improved compared with the traditional IDW algorithm. Further, when the distributions $p_{t\_s}=p_{d\_s}$, the test errors of the algorithm are lower than the corresponding test errors when the distributions $p_{t\_s} \neq p_{d\_s}$. It indicates that the proposed algorithm is fully capable of directly performing training data collection and can obtain a superior performance in the 3D electromagnetic spectrum space that the spectrum situation completion application is used.

Further, in order to evaluate the completion performance improvement and the structure superiority of 3D-SSCGAN in the proposed algorithm, a comparison structure named 3D-CompareGAN is constructed. The dilated convolution and PatchGAN are no longer used is the comparison structure. Therefore, the off-line training and online deployment stages of the proposed algorithm are executed based on 3D-SSCGAN and 3D-CompareGAN, and average MSEs of the two structures are compared in different training rounds, where random received power distributions $p_{t\_s} \neq p_{d\_s}$. The comparison results show that the generative adversarial network based on the 3D-SSCGAN structure has a more stable performance in terms of both training errors and testing errors and lower algorithm completion errors than the generative adversarial network based on the 3D-CompareGAN structure. Therefore, the proposed 3D-SSCGAN structure can effectively improve the training stability and completion performance of the 3D spectrum situation completion algorithm.

Embodiment 3

This embodiment of the present disclosure has the same inventive concept as Embodiments 1 and 2. This embodiment of the present disclosure provides a 3D spectrum situation completion device based on a generative adversarial network. The 3D spectrum situation completion device may include:

a preprocessing module configured to perform graying and coloring preprocessing based on an incomplete 3D spectrum situation obtained by a UAV through sampling a target region, obtain a three-channel incomplete 3D spectrum situation map displayed in colors, and form a training set based on the obtained three-channel incomplete 3D spectrum situation map displayed in colors;

a training module configured to train the generative adversarial network based on the training set and obtain a trained generator network in the generative adversarial network, where the generative adversarial network is configured with a sampling processing function, and the sampling processing function is used to perform sampling processing on a three-channel complete 3D spectrum situation map displayed in colors that is outputted by the generator network in the generative adversarial network based on sampled and unsampled position points in the three-channel incomplete 3D spectrum situation map displayed in colors that is inputted into the generative adversarial network; and a completion module configured to perform graying and coloring preprocessing based on a measured incomplete 3D spectrum situation obtained by the UAV through sampling a specified measurement region, obtain a three-channel measured incomplete 3D spectrum situation map displayed in colors, and use the three-channel measured incomplete 3D spectrum situation map as input data to the generator network to obtain a three-channel measured complete 3D spectrum situation map displayed in colors. It should be noted that in some embodiments, the aforementioned modules may be implemented in any one and/or combinations of a digital electronic circuit system, an integrated circuit system, a field programmable gate array (FPGA), an application-specific integrated circuit (ASIC), an application specific standard product (ASSP), a system on chip (SoC), a complex programmable logic device (CPLD), computer hardware, firmware, and software.

Specifically, the sampling processing function in the training module may be configured to:
- determine a numerical matrix, where the numerical matrix includes a first specified numerical column of the sampled position points and a second specified numerical column of the unsampled position points and where the first specified numerical column is different from the second specified numerical column; and
- calculate a Hadamard product of the numerical matrix and the three-channel complete 3D spectrum situation map displayed in colors.

Specifically, the graying and coloring preprocessing performed by the preprocessing module may include:
- calculating a normalized value for the incomplete 3D spectrum situation (i.e. the incomplete 3D radio frequency map) based on incomplete historical or empirical spectrum data; and determining, based on the normalized value, a single-channel incomplete 3D spectrum situation map displayed in grayscale.

Specifically, the graying and coloring preprocessing performed by the preprocessing module may further include:
- copying twice the single-channel incomplete 3D spectrum situation map (i.e. the single-channel incomplete 3D radio frequency map), obtaining a two-channel incomplete 3D spectrum situation map (i.e. a two-channel incomplete 3D radio frequency map);
- expanding the single-channel incomplete 3D spectrum situation map (i.e. the single-channel incomplete 3D radio frequency map) by the two-channel incomplete 3D spectrum situation map (i.e. the two-channel incomplete 3D radio frequency map), obtaining a three-channel incomplete 3D spectrum situation map (i.e. a three-channel incomplete 3D radio frequency map) displayed in grayscale; and
- coloring with a specified color unsampled position points in the three-channel incomplete 3D spectrum situation map displayed in grayscale to obtain the three-channel incomplete 3D spectrum situation map displayed in colors, where the colors include the grayscale and the specified color.

Specifically, in the generative adversarial network,
the input data of the generator network is configured as the three-channel incomplete 3D spectrum situation map displayed in colors; and
output data of the generator network is used as the three-channel complete 3D spectrum situation map displayed in colors.

Specifically, in the generative adversarial network,
the generator network includes an input-side 3D convolutional layer, two down-sampling module, six residual modules, two residual modules, and an output-side 3D convolutional layer;
the input data of the generator network is processed sequentially by the input-side 3D convolutional layer, the down-sampling module, the residual module, the up-sampling module, and the output-side 3D convolutional layer of the generator network; and
the residual module of the generator network has a dilated convolutional layer.

Specifically, in the generative adversarial network,
input data of a discriminator network is configured as the three-channel incomplete 3D spectrum situation map displayed in colors or a three-channel complete 3D spectrum situation map after sampling processing.

Specifically, in the generative adversarial network,
the discriminator network includes an input-side 3D convolutional layer, two down-sampling modules, three residual modules, and an output-side 3D convolutional layer;
the input data of the discriminator network is processed sequentially by the input-side 3D convolutional layer, the down-sampling module, the residual module, and the output-side 3D convolutional layer of the discriminator network; and
the residual module of the discriminator network has a dilated convolutional layer.

Specifically, in the generative adversarial network,
a hyperparameter set of the residual module of the discriminator network is used to input the output data of a specified number of channels to the output-side 3D convolutional layer of the discriminator network; and
the output-side 3D convolutional layer of the discriminator network has a controlled hyperparameter set.

Specifically, in the generative adversarial network,
an objective function of the generative adversarial network is configured with a gradient penalty term without a latent variable and with a weighted reconstruction loss; and
calculation of the weight of the reconstruction loss includes calculation of a Hadamard product of the weight and the three-channel incomplete 3D spectrum situation map displayed in colors, a Hadamard product of the weight and the three-channel complete 3D spectrum situation map displayed in colors, and a 1-Norm of a difference between the two Hadamard products.

Specifically, the training of the generative adversarial network may include:
sampling a real sample from the training set based on a configured training parameter; and
performing a calculation based on the real sample and a simulation sample after sampling processing based on a Wasserstein distance to obtain a three-channel penalty 3D spectrum situation map displayed in colors, where
the simulation sample after sampling processing is obtained after the real sample is processed by the generator network and sampling processing is performed on the real sample with the sampling processing function.

Specifically, in the generative adversarial network,
the input data of the discriminator network is further configured as the penalty 3D spectrum situation map, and the output data of the discriminator network is represented with a matrix; and
calculation of the gradient penalty term includes the calculation of a gradient of the output data of the discriminator network with respect to the penalty 3D spectrum situation map and a 2-norm of the gradient.

Specifically, the training of the generative adversarial network may further include:

determining an expression for the sampling processing function based on a specific distribution of sampled and unsampled position points in the real sample; and calculating, by using the expression and the training set, a gradient(s) of the objective function and/or the reconstruction loss with respect to the parameter.

The embodiments of the present disclosure use only incomplete rather than complete historical or empirical spectrum data to train the generative adversarial network, thus resolving the problem that the complete 3D spectrum situation is difficult to be obtained accurately. In the embodiments of the present disclosure, the UAV samples spectrum data in the 3D target region following the specified or unspecified trajectories rather than random complex trajectories, breaking the constraints such as the long flight time of the UAV equipped with the radio monitoring device or deployment difficulty.

In the embodiments of the present disclosure, according to the 3D spectrum situation completion algorithm based on the generative adversarial network, the generative adversarial network can learn without any complete 3D spectrum situation. To be specific, feature extraction is performed on the incomplete historical or empirical spectrum data to more realistically show the received power distribution to further improve the 3D spectrum situation completion performance. In the embodiments of the present disclosure, based on 3D-SSCGAN, the proposed 3D spectrum situation completion algorithm can achieve stable extraction of environment features and reduce the loss of useful information in the 3D electromagnetic spectrum space in the case of unknown complete 3D spectrum situation and very little effective data. Further, the mapping relationship between the incomplete 3D spectrum situation and the complete 3D spectrum situation is learned with the importance of the radiation source as the guide.

According to the sampling processing function, the embodiments of the disclosure realize off-line training of 3D-SSCGAN through unsupervised learning. In this way, the algorithm can be deployed in the actual 3D electromagnetic spectrum space when the random received power distribution in the actual deployment environment is the same as or different from the random received power distribution in the training set to achieve precise 3D spectrum situation completion.

An embodiment of the present disclosure further provides an electronic device, including at least one processor and memory connected to at least one processor. The memory stores an instruction executable by at least one processor, and at least one processor executes the instruction stored in the memory to implement the method described above. An embodiment of the present disclosure further provides a computer-readable storage medium storing a computer instruction. When the computer instruction runs on a computer, the computer is enabled to execute the method described above.

The foregoing describes optional implementations of the examples of the present disclosure in detail by referring to the accompanying drawings. However, the examples of the present disclosure are not limited to the specific details in the foregoing implementations. Within the scope of the technical concept of the examples of the present disclosure, various simple variations can be made to the technical solutions in the examples of the present disclosure. These simple variations all fall within the protection scope of the examples of the present disclosure.

In addition, it should be noted that various specific technical features described in the foregoing examples can be combined in any suitable manner, provided that there is no contradiction. To avoid unnecessary repetition, various possible combinations are not separately described in the examples of the present disclosure.

A person skilled in the art can understand that all or some of the steps for implementing the method in the foregoing examples can be completed by a program instructing relevant hardware. The program is stored in a storage medium and includes a plurality of instructions to enable a single-chip microcomputer, a chip, or a processor to perform all or some of the steps in the method described in each example of the present disclosure. The foregoing storage medium may be non-transient and include any medium that can store a program code, such as a universal serial bus (USB) flash drive, a hard disk, a read-only memory (ROM), a random access memory (RAM), a flash memory, a magnetic disk, or an optical disk.

In addition, different examples of the present disclosure can also be arbitrarily combined, provided that the combinations do not violate the idea of the examples of the present disclosure. The combinations should also be regarded as part of the content disclosed in the examples of the present disclosure.

What is claimed is:

1. A three-dimensional (3D) spectrum situation completion method based on a generative adversarial network performed by an unmanned aerial vehicle (UAV) connected to a computer, comprising:

performing graying and coloring preprocessing based on incomplete 3D spectrum situations from historical or empirical spectrum data obtained by an unmanned aerial vehicle (UAV) through sampling a target region, obtaining three-channel incomplete 3D spectrum situation maps displayed in colors, and forming a training set based on the obtained three-channel incomplete 3D spectrum situation maps displayed in colors;

training the generative adversarial network based on the training set and obtaining a trained generator network in the generative adversarial network, wherein the generative adversarial network is configured with a sampling processing function, and the sampling processing function is used to perform, based on sampled and unsampled position points in the three-channel incomplete 3D spectrum situation maps displayed in colors that are inputted into the generative adversarial network, sampling processing on a three-channel complete 3D spectrum situation maps displayed in colors that are outputted by the generator network in the generative adversarial network; and performing graying and coloring preprocessing based on a measured incomplete 3D spectrum situation obtained by the UAV through sampling a specified measurement region, obtaining a three-channel measured incomplete 3D spectrum situation map displayed in colors, and using the three-channel measured incomplete 3D spectrum situation map as input data to the generator network to obtain a three-channel measured complete 3D spectrum situation map displayed in colors, wherein the performing, based on the sampled and unsampled position points in the three-channel incomplete 3D spectrum situation map displayed in colors that is inputted into the generative adversarial network, sampling processing on the three-channel complete 3D spectrum situation map displayed in colors that is outputted by the generator network in the generative adversarial network comprises:
  determining a numerical matrix, wherein the numerical matrix comprises a first specified numerical column of the sampled position points and a second specified numerical column of the unsampled position points, and the first specified numerical column is different from the second specified numerical column; and
  calculating a Hadamard product of the numerical matrix and the three-channel complete 3D spectrum situation map displayed in colors.

2. The 3D spectrum situation completion method based on the generative adversarial network according to claim 1, wherein the graying and coloring preprocessing comprises:
  calculating a normalized value for the incomplete 3D spectrum situation based on incomplete historical or empirical spectrum data; and
  determining, based on the normalized value, a single-channel incomplete 3D spectrum situation map displayed in grayscale.

3. The 3D spectrum situation completion method based on the generative adversarial network according to claim 2, wherein the graying and coloring preprocessing further comprises:
  copying twice the single-channel incomplete 3D spectrum situation map;
  obtaining a two-channel incomplete 3D spectrum situation map;
  expanding the single-channel incomplete 3D spectrum situation map by the two-channel incomplete 3D spectrum situation map, obtaining a three-channel incomplete 3D spectrum situation map displayed in grayscale; and
  coloring with a specified color unsampled position points in the three-channel incomplete 3D spectrum situation map displayed in grayscale to obtain the three-channel incomplete 3D spectrum situation map displayed in colors, wherein the colors comprise the grayscale and the specified color.

4. The 3D spectrum situation completion method based on the generative adversarial network according to claim 3, wherein in the generative adversarial network,
  the input data of the generator network is configured as the three-channel incomplete 3D spectrum situation map displayed in colors; and
  output data of the generator network is used as the three-channel complete 3D spectrum situation map displayed in colors.

5. The 3D spectrum situation completion method based on the generative adversarial network according to claim 4, wherein in the generative adversarial network,
  the generator network comprises an input-side 3D convolutional layer, two down-sampling module, six residual modules, two residual modules, and an output-side 3D convolutional layer;
  the input data of the generator network is processed sequentially by the input-side 3D convolutional layer, the down-sampling module, the residual module, the up-sampling module, and the output-side 3D convolutional layer of the generator network; and
  the residual module of the generator network has a dilated convolutional layer.

6. The 3D spectrum situation completion method based on the generative adversarial network according to claim 4, wherein in the generative adversarial network,
  input data of a discriminator network is configured as the three-channel incomplete 3D spectrum situation map displayed in colors, or a three-channel complete 3D spectrum situation map after sampling processing.

7. The 3D spectrum situation completion method based on the generative adversarial network according to claim 6, wherein in the generative adversarial network,
  the discriminator network comprises an input-side 3D convolutional layer, two down-sampling modules, three residual modules, and an output-side 3D convolutional layer;
  the input data of the discriminator network is processed sequentially by the input-side 3D convolutional layer, the down-sampling modules, the residual modules, and the output-side 3D convolutional layer of the discriminator network; and
  the residual modules of the discriminator network have a dilated convolutional layer.

8. The 3D spectrum situation completion method based on the generative adversarial network according to claim 7, wherein in the generative adversarial network,
  a hyperparameter set of the residual modules of the discriminator network is used to input an output data of a specified number of channels to the output-side 3D convolutional layer of the discriminator network; and
  the output-side 3D convolutional layer of the discriminator network has a controlled hyperparameter set.

9. A three-dimensional (3D) spectrum situation completion method based on a generative adversarial network performed by an unmanned aerial vehicle (UAV) connected to a computer, comprising:
  performing graying and coloring preprocessing based on incomplete 3D spectrum situations from historical or empirical spectrum data obtained by an unmanned aerial vehicle (UAV) through sampling a target region, obtaining three-channel incomplete 3D spectrum situation maps displayed in colors, and forming a training set based on the obtained three-channel incomplete 3D spectrum situation maps displayed in colors;
  training the generative adversarial network based on the training set and obtaining a trained generator network in the generative adversarial network, wherein the generative adversarial network is configured with a sampling processing function, and the sampling processing function is used to perform, based on sampled and unsampled position points in the three-channel incomplete 3D spectrum situation maps displayed in colors that are inputted into the generative adversarial network, sampling processing on a three-channel complete 3D spectrum situation maps displayed in colors that are outputted by the generator network in the generative adversarial network; and
  performing graying and coloring preprocessing based on a measured incomplete 3D spectrum situation obtained by the UAV through sampling a specified measurement region, obtaining a three-channel measured incomplete 3D spectrum situation map displayed in colors, and using the three-channel measured incomplete 3D spectrum situation map as input data to the generator network to obtain a three-channel measured complete 3D spectrum situation map displayed in colors,
  wherein in the generative adversarial network,
    an objective function of the generative adversarial network is configured with a gradient penalty term without a latent variable and with a weighted reconstruction loss; and calculation of the weight of the reconstruction loss comprises calculation of a Hadamard product of the weight and the three-channel incomplete 3D spectrum situation map displayed in colors, a Hadamard product of the weight and the three-channel complete 3D spectrum situation map displayed in colors, and a 1-Norm of a difference between the two Hadamard products.

10. The 3D spectrum situation completion method based on the generative adversarial network according to claim 9, wherein the training of the generative adversarial network comprises:
    sampling a real sample from the training set based on a configured training parameter; and
    performing calculation based on the real sample and a simulation sample after sampling processing based on a Wasserstein distance to obtain a three-channel penalty 3D spectrum situation map displayed in colors, wherein the simulation sample after sampling processing is obtained after the real sample is processed by the generator network and the sampling processing is performed on the real sample with the sampling processing function.

11. The 3D spectrum situation completion method based on the generative adversarial network according to claim 10, wherein in the generative adversarial network,
    the input data of the discriminator network is further configured as the penalty 3D spectrum situation map, and an output data of the discriminator network is represented with a matrix; and
    calculation of the gradient penalty term comprises calculation of a gradient of the output data of the discriminator network with respect to the penalty 3D spectrum situation map and a 2-norm of the gradient.

12. The 3D spectrum situation completion method based on the generative adversarial network according to claim 10, wherein the training of the generative adversarial network further comprises:
    determining an expression for the sampling processing function based on a specific distribution of sampled and unsampled position points in the real sample; and
    calculating, by using the expression and the training set, a gradient of the objective function or the reconstruction loss with respect to the parameter.

13. A three-dimensional (3D) spectrum situation completion device based on a generative adversarial network, comprising:
    a preprocessing module configured to perform graying and coloring preprocessing based on an incomplete 3D spectrum situation obtained by an unmanned aerial vehicle (UAV) through sampling a target region, obtain a three-channel incomplete 3D spectrum situation map displayed in colors, and form a training set based on the obtained three-channel incomplete 3D spectrum situation map displayed in colors;
    a training module configured to train the generative adversarial network based on the training set and obtain a trained generator network in the generative adversarial network, wherein the generative adversarial network is configured with a sampling processing function, and the sampling processing function is used to perform, based on sampled and unsampled position points in the three-channel incomplete 3D spectrum situation map displayed in colors that is inputted into the generative adversarial network, sampling processing on a three-channel complete 3D spectrum situation map displayed in colors that is outputted by the generator network in the generative adversarial network; and
    a completion module configured to perform graying and coloring preprocessing based on a measured incomplete 3D spectrum situation obtained by the UAV through sampling a specified measurement region, obtain a three-channel measured incomplete 3D spectrum situation map displayed in colors, and use the three-channel measured incomplete 3D spectrum situation map as input data to the generator network to obtain a three-channel measured complete 3D spectrum situation map displayed in colors,
    wherein sampling processing comprises
        determining a numerical matrix, wherein the numerical matrix comprises a first specified numerical column of the sampled position points and a second specified numerical column of the unsampled position points, and the first specified numerical column is different from the second specified numerical column; and
        calculating a Hadamard product of the numerical matrix and the three-channel complete 3D spectrum situation map displayed in colors.

14. The 3D spectrum situation completion method based on the generative adversarial network according to claim 8, wherein in the generative adversarial network,
    an objective function of the generative adversarial network is configured with a gradient penalty term without a latent variable and with a weighted reconstruction loss; and
    calculation of the weight of the reconstruction loss comprises calculation of a Hadamard product of the weight and the three-channel incomplete 3D spectrum situation map displayed in colors, a Hadamard product of the weight and the three-channel complete 3D spectrum situation map displayed in colors, and a 1-Norm of a difference between the two Hadamard products.

* * * * *